United States Patent
Horner et al.

(10) Patent No.: US 7,032,884 B2
(45) Date of Patent: Apr. 25, 2006

(54) OUTFLOW VALVE BUTTERFLY PLATE RETENTION PIN

(75) Inventors: Darrell W. Horner, Oro Valley, AZ (US); William M. Scherzinger, Tucson, AZ (US); Gregor McDowall, Phoenix, AZ (US); Wayne T. Pearson, Tucson, AZ (US)

(73) Assignee: Honeywell International, Inc., Morristown, NJ (US)

( * ) Notice: Subject to any disclaimer, the term of this patent is extended or adjusted under 35 U.S.C. 154(b) by 44 days.

(21) Appl. No.: 10/854,100

(22) Filed: May 26, 2004

(65) Prior Publication Data

US 2005/0263733 A1  Dec. 1, 2005

(51) Int. Cl.
  *F16K 1/22* (2006.01)

(52) U.S. Cl. .................. 251/308; 251/305; 123/337
(58) Field of Classification Search ............... 251/305, 251/306, 307, 308; 123/337
  See application file for complete search history.

(56) References Cited

U.S. PATENT DOCUMENTS

| | | | |
|---|---|---|---|
| 3,065,950 A | | 11/1962 | Goldberg |
| 3,410,520 A | * | 11/1968 | Mohoney .................... 251/173 |
| 3,512,752 A | | 5/1970 | Uerlichs et al. |
| 3,843,090 A | | 10/1974 | Schneider et al. |
| 4,047,696 A | | 9/1977 | Ludwig |
| 4,712,768 A | | 12/1987 | Herr et al. |
| 5,000,212 A | | 3/1991 | Tervo |
| 5,458,148 A | | 10/1995 | Zelczer et al. |
| 5,743,512 A | | 4/1998 | Greenberg |
| 6,446,934 B1 | | 9/2002 | Bonomi |
| 2002/0162983 A1 | | 11/2002 | Bailey |
| 2003/0209682 A1 | | 11/2003 | Jessberger et al. |

* cited by examiner

*Primary Examiner*—Edward K. Look
*Assistant Examiner*—John K. Fristoe, Jr.
(74) *Attorney, Agent, or Firm*—Ingrassia Fisher & Lorenz

(57) ABSTRACT

Methods and apparatus for retaining a butterfly plate within a valve housing after complete drive shaft failure. More particularly, the present invention is directed to the use of a pin extending between the butterfly plate and the valve housing where an end of the pin extends into a semi-circular channel centered on the center axis of the drive shaft. In preferred embodiments, the pin is immovably fixed to the valve housing, and extends into a channel on the butterfly plate assembly where the channel is sized, dimensioned, and positioned such that it corresponds to the path of an end of the pin as the plate rotates on the drive shaft.

12 Claims, 4 Drawing Sheets

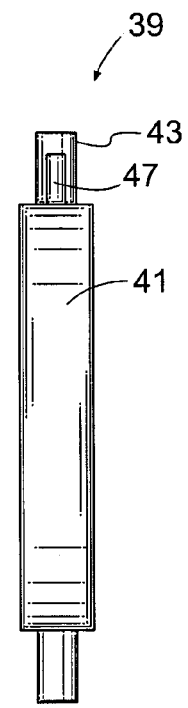
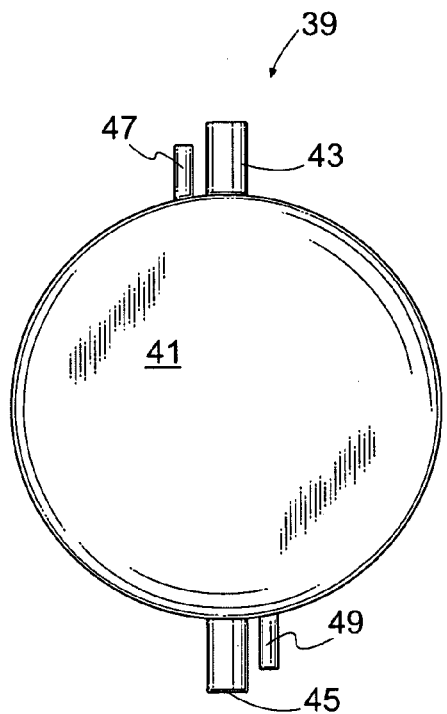
Fig. 10
Fig. 11
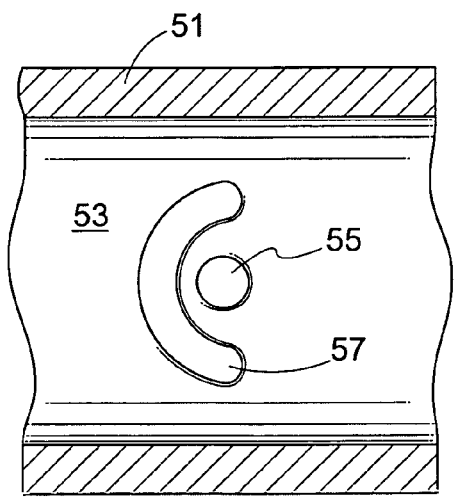
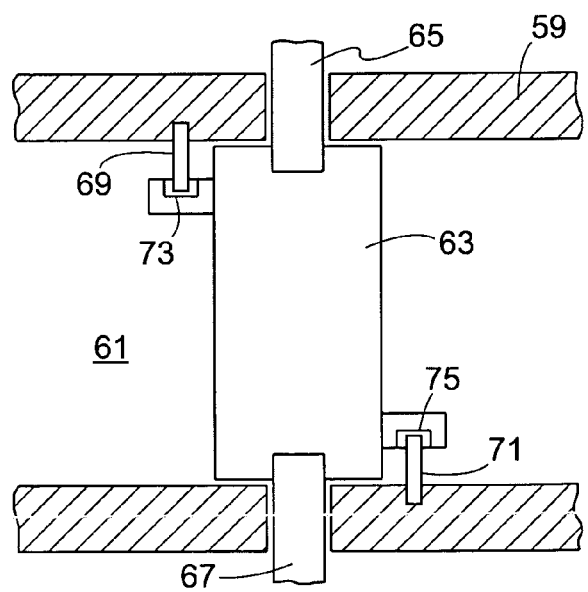
Fig. 12
Fig. 13

OUTFLOW VALVE BUTTERFLY PLATE RETENTION PIN

FIELD OF THE INVENTION

The present invention relates generally to flow control valves, and more particularly to butterfly type fluid flow control valves used in aircraft cabin pressure control systems.

BACKGROUND OF THE INVENTION

Many aircraft utilize a cabin pressure control system (CPCS) to control the pressure of a cabin, an enclosed space within the fuselage of the aircraft containing crew, passengers, and/or cargo during flight. For a high altitude pressurized airplane, the CPCS must prevent decompression of the fuselage. Decompression of the fuselage above certain limits (hereinafter "catastrophic decompression" or simply "decompression") is considered a catastrophic event by the Federal Aviation Administration (FAA) and the European Joint Aviation Authorities (JAA). FAA and JAA guidelines state that no single point failure, regardless of the probability, may lead to a catastrophic event.

One type of CPCS utilizes a butterfly-type outflow valve, which contains a butterfly plate (disk) rotating on a drive shaft in the bore of a housing of the valve. Butterfly plate design has progressed sufficiently to ensure that the butterfly plate itself cannot crack or break apart and cause catastrophic decompression. Unfortunately, the same does not hold true for valve plate drive shafts. In many prior art devices this was not a problem as the devices were designed such that drive shaft failure was inherently unable to allow the butterfly plate to separate from the valve housing. However, recent design requirements aimed at decreasing leakage of fully closed valves have resulted in designs where the drive shaft is "slanted" relative to the butterfly plate (i.e. not coplanar with the plate) to allow the plate a full, uninterrupted seal about its circumference. Slanting the drive shaft relative to the plate causes a portion of the drive shaft to be exposed, i.e. not completely retained by the valve. With a portion of the shaft exposed, failure of the shaft can result in the butterfly plate separating from the valve housing with the catastrophic decompression being a possible result. Whether or not heretofore recognized as a problem, the possibility of catastrophic decompression due to drive shaft failure in recent designs warrants development of methods and apparatus directed toward preventing catastrophic decompression even if drive shaft failure occurs in such designs.

SUMMARY OF THE INVENTION

The present invention is directed to methods and apparatus for retaining a butterfly plate within a valve housing after complete drive shaft failure. More particularly, the present invention is directed to the use of a pin or other retaining member extending between the butterfly plate and the valve housing where an end of the pin extends into a semi-circular channel centered on the center axis of the drive shaft. In preferred embodiments, the pin is immovably fixed to the valve housing, and extends into a channel on the butterfly plate assembly where the channel is sized, dimensioned, and positioned such that it corresponds to the path of an end of the pin as the plate rotates on the drive shaft.

BRIEF DESCRIPTION OF THE DRAWINGS

The exact nature of this invention, as well as the objects and advantages thereof, will become readily apparent from consideration of the following specification in conjunction with the accompanying drawings in which like reference numerals designate like parts throughout the figures thereof and wherein:

FIG. 10 is a side view of a valve plate, drive shaft and retaining pin assembly of an alternative valve according to the present invention.

FIG. 11 is a front view of the assembly of FIG. 10.

FIG. 12 is a cutaway view of a housing adapted to receive the assembly of FIG. 10.

FIG. 13 is a cutaway view of an alternative valve according to the present invention.

DETAILED DESCRIPTION OF THE PREFERRED EMBODIMENTS

Figure 1:
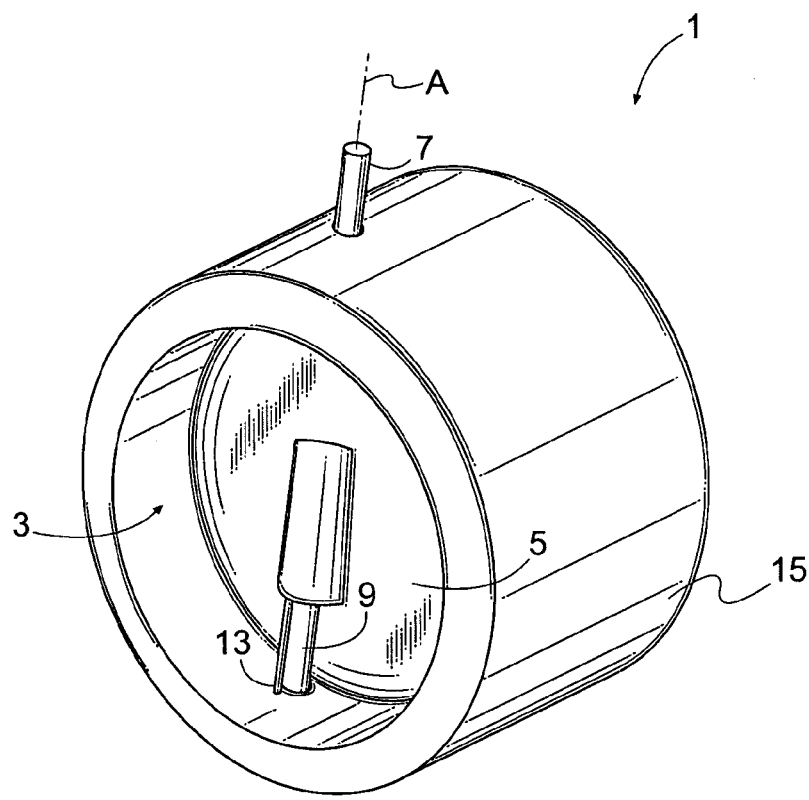
FIG. 1 is perspective view of a valve according to the present invention.
Figure 2:
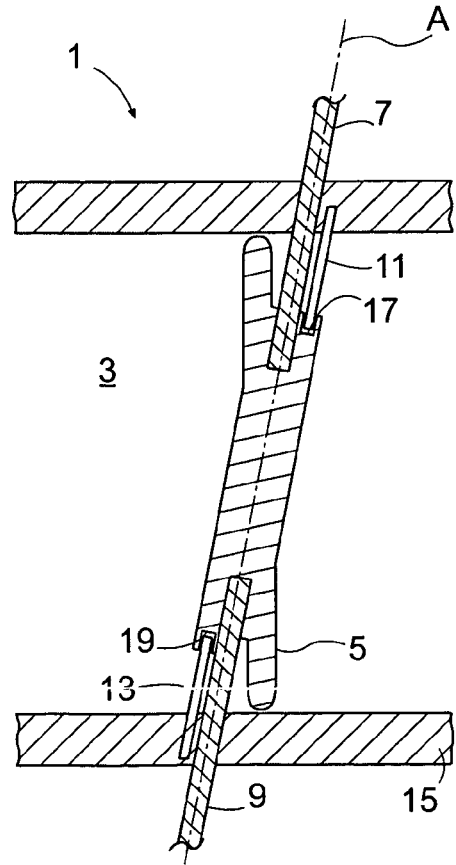
FIG. 2 is side cutaway view of the valve of FIG. 1.
Figure 3:
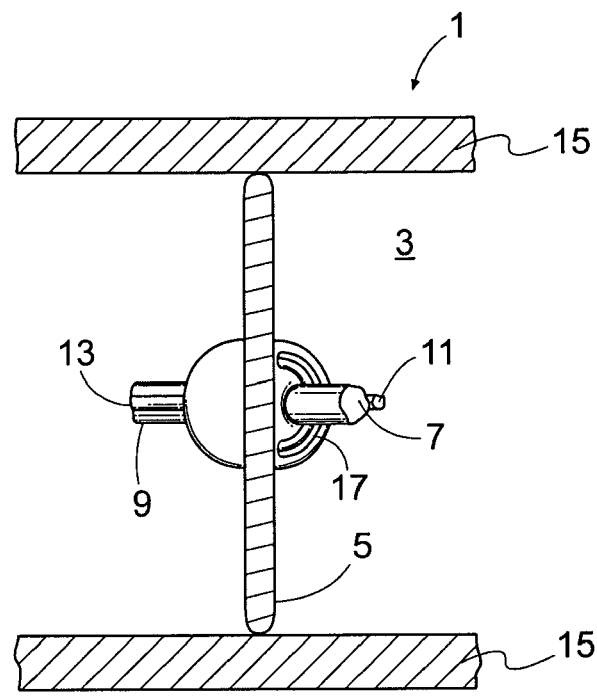
FIG. 3 is a top cutaway view of the valve of FIG. 1.
Figure 4:
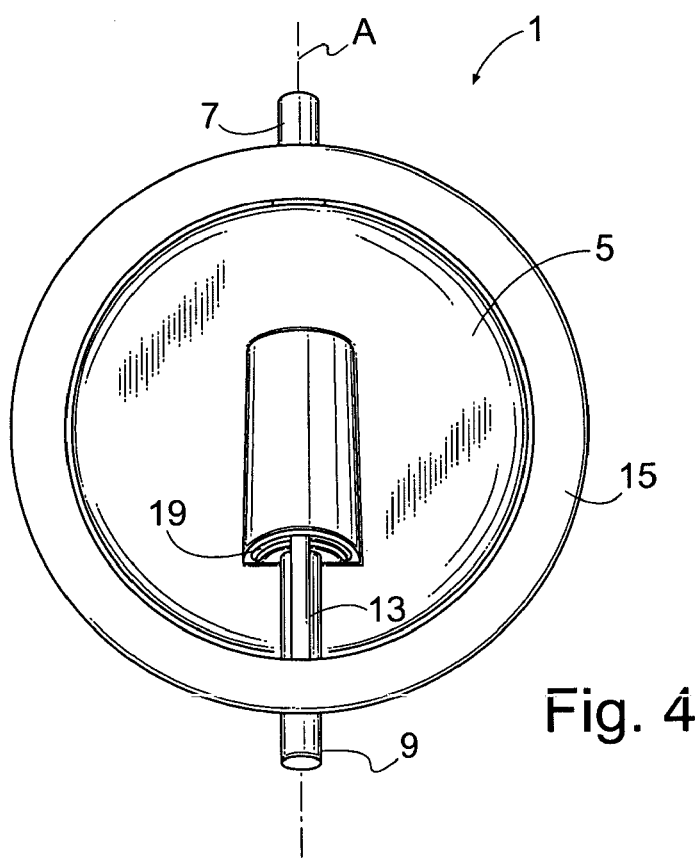
FIG. 4 is a front view of the valve of FIG. 1.

Reference will now be made to the preferred embodiments of the invention, examples of which are illustrated in the accompanying drawings. While the invention will be described in conjunction with the preferred embodiments, it will be understood that these embodiments are not intended to limit the invention. On the contrary, the invention is intended to cover alternatives, modifications and equivalents, which may be included within the spirit and scope of the invention as defined by the appended claims. In the following detailed description, numerous specific details are set forth in order to provide a thorough understanding of the present invention. However, it will be understood by one of ordinary skill in the art that the present invention may be practiced without these specific details. In other instances, well known methods, procedures, components, and circuits have not been described in detail so as not to unnecessarily obscure the important aspects of the present invention.

In FIGS. 1–6, a valve 1 comprises a bore 3, a valve plate 5, coaxial drive shaft segments 7 and 9, retention members in the form of pins 11 and 13, and a housing 15. The valve plate 5 comprises semi-circular grooves 17 and 19 centered on and perpendicular to the axis of rotation A of the shafts 7 and 9 and the plate 5.

It is contemplated that alternative embodiments will likely comprise elements in addition to those described in relation to figures 1–13, and/or may include different numbers or types of the described elements. It is also contemplated that any element may be formed from any reasonable material or combination of materials, that multiple elements may be part of a single unitary structure, may all be separate pieces, and/or one or more of them may be an assembly of a plurality of pieces.

It is contemplated that the present invention is particularly well suited for use with butterfly type valves, more particularly with butterfly type valves having a drive shaft tilted relative to the valve plate, and even more particularly with butterfly type valves having tilted drive shafts that are used in cabin pressure control systems (CPCSs). However, the present invention may also be applicable in other types of valves where a part or assembly rotates about a shaft and it is desirable to prevent unwanted movement of the part or assembly in case of shaft failure. In some instances it may also be applicable to non-valve assemblies as well.

The bore 3 defines a flow path through the valve 1 which is opened and closed via rotation of the plate 5 on the drive shaft segments 7 and 9. The actual size and shape of the bore is not critical to the present invention. However, it is contemplated that the present invention is particularly advantageous when used in valves where the segment of the bore within which the valve plate rotates is cylindrical and has an internal diameter approximately equal to the diameter of the valve plate 5.

The valve plate 5 may comprise any reasonable size or shape such that it operates to at least partially open and close the flow path defined by the bore 3. In preferred embodiments it comprises a unitary structure cast or otherwise formed from steel, a metallic allow, or some other material or combination of materials. In preferred embodiments it also, as will be discussed further, comprises a channel that a retention member extends into.

The plate 5 may be coupled to a single drive shaft, two drive shaft segments as shown in FIGS. 1-4, or to some other mechanism suitable for rotating the plate about an axis of rotation passing through the bore. In some instances the axis of rotation may be perpendicular to the centerline of the bore while in other instances it may not. In the preferred embodiment shown in FIGS. 1-6 the plate 5 is tilted relative to the centerline of the coaxial shaft segments 7 and 9. The majority of the plate 5 is in the form of a cylindrical disk with the center line of the disk being substantially collinear with the center line of the bore 3 when the plate is in a closed position, i.e. rotated such that the disk substantially or completely blocks the bore 3. The segments 7 and 9 are tilted/slanted in that their centerline is not perpendicular to the centerline of the disk portion of the plate 5. Neither is their centerline perpendicular to the centerline of the bore 3.

The segments 7 and 9 may, in some embodiments be replaced by a single drive shaft. In other embodiments they may comprise protruding portions of the plate 5. In still other embodiments, they may comprise some other structure adapted to rotate the plate 5 within the bore 3. In the preferred embodiment shown, the segments 7 and 9 extend at least partially through the sides of the bore 3 and into the housing 15. It is preferable that at least one of the segments be coupled to an actuator such that the valve 1 can be remotely opened and closed. Any type of actuator may be used such that in some instances pressure differentials will be used to open and close the valve while in other electrical power will be used to open and close the valve.

The valve of FIGS. 1-6 comprises retaining members in the form of pins 11 and 13. In the preferred embodiment, the pins 11 and 13 are each immoveably coupled to the housing 15, or at least coupled to the housing 15 in a manner such that they do not rotate as the plate 5 rotates. Although preferably pins, the retaining members may comprise any size or shape so long as they extend between the valve plate and the housing (or a part or assembly coupled to the housing) such that they will retain the plate 5 within the bore 3 should one or both of the shaft segments 7 and 9 fail.

Although it is preferably that the pins 11 and 13 be substantially parallel to the shaft segments 7 and 9, it is contemplate that in some embodiments either one or both may be inclined relative to one or both of the segments 7 and 9.

Figure 5:
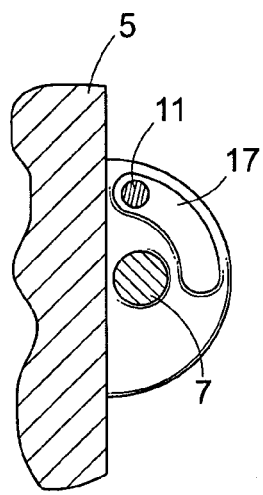
FIG. 5 is a detailed view of the valve of FIG. 1 in a closed position.
Figure 6:
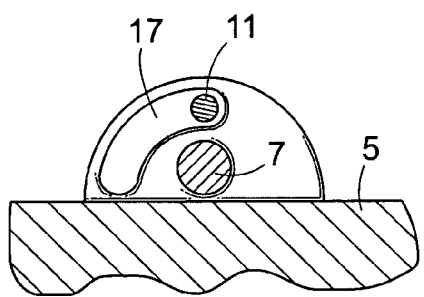
FIG. 6 is a detailed view of the valve of FIG. 1 in an open position.
Figure 7:
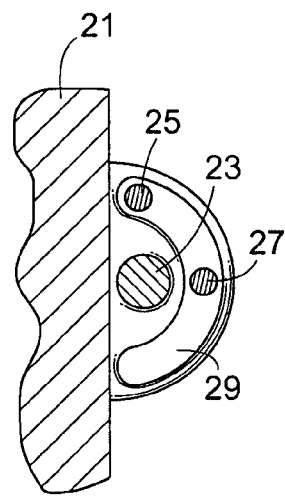
FIG. 7 is a detailed view of the an alternative valve according to the present invention in a closed position.
Figure 8:
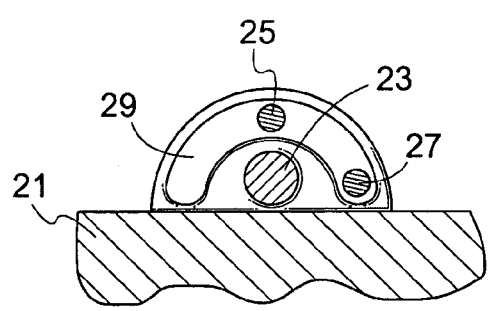
FIG. 8 is a detailed view of the valve of FIG. 7 in an open position.
Figure 9:
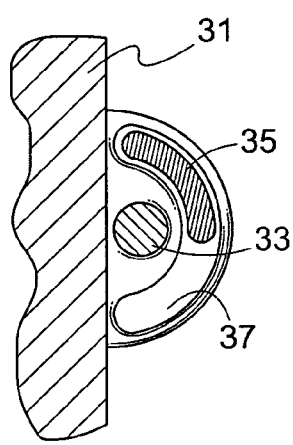
FIG. 9 is a detailed view of the an alternative valve according to the present invention in a closed position.

The positioning of the pin 11 relative to the shaft segment 7 and the pin 13 relative to the shaft segment 9 may vary between embodiments. This is illustrated in FIGS. 5 and 6 wherein the pin 11 is positioned relative to the shaft segment 7 such that it is adjacent the plate 5 when the plate is in a closed position, and, when the plate 5 is in an open position, is positioned opposite of the plate 5 relative to the pin 11. In contrast, in FIGS. 7 and 8, the pin 27 is opposite the plate 21 when the plate 21 is in a closed position, and adjacent to the plate 21 when the plate 21 is in an open position. FIGS. 7-8 also illustrate alternative embodiments that utilize a plurality of pins extending into the plate channel. FIG. 9 illustrates the use of a retaining member 35 that is not a pin, but still extends into a channel 37 of a plate 31, and does so at least partially along a line parallel to drive a shaft 33.

Comparing FIGS. 5 and 6 with FIGS. 7 and 8 also illustrates that the valve plate channel (17, 29) of an embodiment may comprise different shapes. In FIGS. 5 and 6 it is semicircular and forms an arc having an arc angle of approximately 90 degrees, while in FIGS. 8 and 9 it has an arc angle of approximately 180 degrees.

Valve plate channels are preferably formed in a surface of the valve plate, but may be formed in a surface of an element coupled to the valve plate, or by defining walls by adding members to the valve plate while using a surface of the plate as the floor of any such channel.

In preferred embodiments channels such as the channels 17, 29, and 37 are, other than at their ends, of uniform width and also of uniform depth. However, it is contemplated that alternative channel configurations may be used. As one of many possibilities, if the retention members are tilted relative to the axis of rotation, the channels may have a non-uniform depth so as to keep the retention member adjacent to the floor of the channel as the valve plate rotates.

It is also preferred that the valve plate channels be sized and positioned such that the retention members extend into the channel, but do not contact the sides or bottom of the channel, throughout the rotation of the valve plate. As such, the retention member does not contact the valve plate unless drive shaft failure occurs. In less preferred embodiments, the retention member may contact the channel walls or floor, and may actually cooperate to support and/or retain the valve plate even when drive shaft failure has not occurred. In some such embodiments the retention member or the valve plate may comprise additional components to couple the retention member to the valve plate.

It is contemplated that in less preferred embodiments retention members may extend outward from the valve plate and into channels in the housing. In FIGS. 10-12 an assembly 39 comprises a valve plate 41, drive shaft segments 43 and 45, and also comprises pin-like retention members 47 and 49. FIG. 12 illustrates a housing 51 having a flow bore 53, shaft receiving bore 55, and channel 57 for receiving the assembly 39 such that one of the shaft segments 43 and 45 would extend into and through the shaft receiving bore 55, and one of the retention members 47 and 49 would extend into the channel 57.

FIG. 13 illustrates an alternative embodiment wherein a housing 59 contains a bore 61, a valve plate 63, drive shaft segment 65 and 67, retention members 69 and 71, and channels 73 and 75. In this embodiment the axis of rotation of the drive shafts is perpendicular to the center line of the bore 61.

Housings such as the housings 15, 51, and 59 may comprise any reasonable size or shape, and may be formed as a single element or a combination of elements, and may be formed from a single material, or from a combination of materials. In many instances housings will be elongated, comprise a cylindrical exterior surface, and also comprise a cylindrical bore such as with the housing 15 that has the bore 3 passing lengthwise through it.

The embodiments of the present invention described herein comprise multiple novel features with each described embodiment including either a single such feature or a combination of such features. Other contemplated embodiments include all combinations of one or more such novel features not explicitly described herein as such combinations are readily discernable from the embodiments described. In light of the various contemplated embodiments, the present invention can be characterized in a number of ways with the following paragraphs providing an example of some such characterizations.

The present invention may be characterized as a valve comprising a valve plate coupled to a drive shaft having an axis of rotation, a semi-circular channel centered on the axis of rotation, and a retention member extending into the channel. In some instances the valve may be such that the drive shaft has ends extending into a housing, and the retention member extends from the housing and into the channel where the channel is formed in a surface of the valve plate. In some such instances, the valve may be such that the housing comprises a bore having a center line, the axis of rotation and the valve plate are not coplanar, and the axis of rotation is not perpendicular to the centerline of the bore. Moreover, the valve may be such that the retention member is an elongated pin extending a long a line substantially parallel to the axis of rotation.

In some instances may also comprise two drive shaft segments extending in opposite directions from the valve plate, and two elongated retention pins extending along two separate lines that are substantially parallel to the axis of rotation, and two semi-circular channels sized, dimensioned, and positioned such that the path of an end of each pin is within a channel as the plate rotates on the drive shaft segments. In some such instances the valve may be such that the pins do not contact the sides of the channel.

In any of the valves described herein, the valve plate, drive shaft, retention member and housing comprise an assembly of a plurality of pieces. Alternatively, in some instances the drive shaft and valve plate may be both part of a single unitary structure.

The present invention may also be characterized as a valve comprising a retaining member extending between a valve plate rotatably mounted within a valve housing, wherein the valve plate is mounted within the housing so as to be rotatable around an axis of rotation, and an end of the member extends into a semi-circular channel centered on the axis of rotation. In some instances, the valve also comprise one or more drive shaft segments extending between the valve plate and valve housing and rotatable about the axis of rotation. In some such instances the retaining member is a pin is immovably fixed to the valve housing, and extends into the channel on the valve plate, where the channel is sized, dimensioned, and positioned such that it corresponds to the path of an end of the pin as the plate rotates on the drive shaft.

In some instances the valve may also comprise a center axis that is substantially parallel to, but offset from, the axis of rotation. Moreover, in some instances the valve plate housing may be rotably mounted within a bore of the housing, the bore having a centerline, and the axis of rotation is not perpendicular to the bore centerline.

In some instances valve may also comprise two retention pins and two channels, each channel being semi-circular and centered on the axis of rotation, each retention pin extending from the housing and into the channel. In some such instances, the retention pins have non-colinear center lines that are offset from but substantially parallel to the axis of rotation.

The present invention may also be characterized as a method of retaining an assembly rotatably mounted on one or more drive shaft segments within a bore, wherein the assembly can be rotated about an axis passing through the drive shaft segments, the method comprising causing one or more retention members to extend from a wall of the bore into the rotably mounted assembly wherein said retention members are not part of the one or more drive shaft segments, and do not overlap the axis of rotation. The method may in some instances be such that the assembly is a valve plate within a valve, and rotation of the assembly causes the valve plate to open and close a flow path defined by the bore. In some such instances, the method may be such that the retention members are sized and positioned such that they will retain the valve plate within the bore even if complete failure of the one or more drive shafts occurs. In some such instances the method may be such that opening and closing the valve plate causes ends of the one or more retention members to follow a path within channels that rotate with the valve plate. It may also be such that the channels are semi-circular and are centered on the axis of rotation of the valve plate.

What is claimed is:

1. A valve, comprising:
    a housing having a bore that defines a flow path therethrough;
    a drive shaft rotationally mounted on the housing, the drive shaft having an axis of rotation;
    a valve plate coupled to the drive shaft, the valve plate having a semi-circular channel formed in a surface thereof, the semi-circular channel centered on the axis of rotation; and
    a retention member extending from the housing and into the channel.

2. The valve of claim 1 wherein the bore has a center line, the axis of rotation and the valve plate are not coplanar, and the axis of rotation is not perpendicular to the centerline of the bore.

3. The valve of claim 2 wherein the retention member is an elongated pin extending along a line substantially parallel to the axis of rotation.

4. The valve of claim 3, wherein the drive shaft comprises two drive shaft segments extending in opposite directions from the valve plate, and wherein the valve further comprises:
    a second elongated retention pin extending along a second line that is substantially parallel to the axis of rotation; and
    a second semi-circular channel formed in a surface of the valve plate,
    wherein each channel is sized, dimensioned, and positioned such that each pin is within one of the channels as the plate rotates on the drive shaft segments.

5. The valve of claim 4 wherein the pins do not contact the sides of the channel.

6. The valve of claim 3 wherein one or more of the valve plate, drive shaft, retention member and housing comprise an assembly of a plurality of pieces.

7. The valve of claim 3 wherein the drive shaft and valve plate are both part of a single unitary structure.

8. A valve, comprising:
   a valve housing having a bore that defines a flow path therethrough;
   one or more drive shaft segments rotationally mounted on the housing, the drive shaft segments rotatable about an axis of rotation;
   a valve plate mounted on the one or more drive shafts and rotatable therewith, the valve plate having a semi-circular channel formed in a surface thereof, the semi-circular channel centered on the axis of rotation; and
   a retaining pin coupled to the valve housing, the retaining pin having an end that extends into the channel, wherein the channel is sized, dimensioned, and positioned such that the end of the pin is within the channel as the plate rotates on the drive shaft.

9. The valve of claim 8 wherein the pin comprises a center axis that is substantially parallel to, but offset from, the axis of rotation.

10. The valve of claim 9 wherein the bore has a centerline, and the axis of rotation is not perpendicular to the bore centerline.

11. The valve of claim 10 wherein the valve comprises two retention pins and two channels, each channel being semi-circular and centered on the axis of rotation, each retention pin extending from the housing and into the channel.

12. The valve of claim 11 wherein the retention pins have non-colinear center lines that are offset from but substantially parallel to the axis of rotation.

* * * * *